(12) United States Patent
Moe et al.

(10) Patent No.: US 7,687,719 B2
(45) Date of Patent: Mar. 30, 2010

(54) COAXIAL CABLE INCLUDING TUBULAR BIMETALLIC OUTER LAYER WITH ANGLED EDGES AND ASSOCIATED METHODS

(75) Inventors: Alan N. Moe, Hickory, NC (US); Larry W. Nelson, Hickory, NC (US)

(73) Assignee: Commscope Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/957,089

(22) Filed: Dec. 14, 2007

(65) Prior Publication Data

US 2009/0151979 A1    Jun. 18, 2009

(51) Int. Cl.
*H01B 7/18* (2006.01)
(52) U.S. Cl. .................................. 174/106 R
(58) Field of Classification Search ............. 174/102 R, 174/106 R, 36
See application file for complete search history.

(56) References Cited

U.S. PATENT DOCUMENTS

| | | | |
|---|---|---|---|
| 2,199,150 A | 4/1940 | Chace | |
| 2,759,990 A | 8/1956 | Bean | |
| 3,327,383 A | 6/1967 | Reed | |
| 3,360,409 A | 12/1967 | Jachimowicz et al. | |
| 3,405,228 A | 10/1968 | Polizzano | |
| 3,541,221 A | 11/1970 | Aupoix et al. | |
| 3,717,719 A | 2/1973 | Smith et al. | 174/107 |
| 3,766,645 A * | 10/1973 | Ziemek | 29/828 |
| 3,823,253 A | 7/1974 | Walter et al. | 174/69 |
| 3,940,049 A | 2/1976 | Richter et al. | 228/107 |
| 4,250,351 A | 2/1981 | Bridges | 174/106 |
| 4,349,243 A | 9/1982 | Amano et al. | 350/96.23 |
| 4,567,321 A | 1/1986 | Harayama | 174/117 |
| 4,816,611 A | 3/1989 | Invernizzi | 174/2 |
| 5,298,682 A | 3/1994 | Salz | 174/105 |
| 5,500,488 A | 3/1996 | Buckel | 174/102 |
| 5,946,798 A | 9/1999 | Buluschek | 29/828 |
| 6,137,058 A | 10/2000 | Moe et al. | 174/102 |
| 6,201,189 B1 | 3/2001 | Carlson et al. | 174/102 |
| 6,246,008 B1 | 6/2001 | Fluckiger et al. | 174/126.1 |
| 6,342,677 B1 | 1/2002 | Lee | 174/106 |
| 6,417,454 B1 | 7/2002 | Biebuyck | 174/106 |
| 6,509,521 B1 | 1/2003 | Geitz | 174/28 |
| 6,696,647 B2 | 2/2004 | Ono et al. | 174/102 |
| 6,697,647 B2 | 2/2004 | Higuchi et al. | 455/567 |
| 6,717,493 B2 | 4/2004 | Chopra et al. | 333/237 |
| 6,800,809 B2 | 10/2004 | Moe et al. | 174/102 |
| 6,831,231 B2 | 12/2004 | Perelman et al. | 174/102 |
| 6,953,888 B2 | 10/2005 | Livshitz et al. | 174/28 |

(Continued)

FOREIGN PATENT DOCUMENTS

EP        1469486        10/2004

*Primary Examiner*—Chau N Nguyen
(74) *Attorney, Agent, or Firm*—Allen, Dyer, Doppelt, Milbrath & Gilchirist, P.A.

(57) ABSTRACT

A coaxial cable may include an inner conductor, an outer conductor and a dielectric material layer therebetween. The outer conductor may include a tubular bimetallic layer and may have a pair of opposing longitudinal edge portions at a longitudinal seam. The tubular bimetallic layer may include an inner metal layer and an outer metal layer bonded thereto and coextensive therewith. In addition, the opposing longitudinal edge portions may be angled outwardly to define a pair of adjacent outwardly extending tabs.

23 Claims, 4 Drawing Sheets

U.S. PATENT DOCUMENTS

| | | |
|---|---|---|
| 6,963,032 B2 | 11/2005 | Yamaguchi et al. .......... 174/102 |
| 7,034,228 B2 | 4/2006 | Yokoi et al. .................. 174/102 |
| 2003/0051897 A1 | 3/2003 | Blouin et al. ............... 174/106 |
| 2004/0089462 A1 | 5/2004 | Buckel ....................... 174/15.1 |
| 2004/0118591 A1 | 6/2004 | Bufanda et al. ............. 174/106 |
| 2005/0092513 A1 | 5/2005 | Brunker et al. .............. 174/102 |

\* cited by examiner

COAXIAL CABLE INCLUDING TUBULAR BIMETALLIC OUTER LAYER WITH ANGLED EDGES AND ASSOCIATED METHODS

FIELD OF THE INVENTION

The present invention relates to the field of communications, and, more particularly, to coaxial cables and associated methods for making the coaxial cables.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and dielectric separating the inner and outer conductors. For example, the dielectric may be a plastic foam material. An outer insulating jacket may also be applied to surround the outer conductor.

One particularly advantageous use of coaxial cable is for connecting electronics at a cellular or wireless base station to an antenna mounted at the top of a nearby antenna tower. For example, the transmitter and receiver located in an equipment shelter may be coupled via coaxial cables to antennas carried by the antenna tower. A typical installation includes a relatively large diameter main coaxial cable extending between the equipment shelter and the top of the antenna tower to thereby reduce signal losses. For example, CommScope, Inc. of Hickory, N.C. offers its CellReach® coaxial cable for such applications.

In larger diameter coaxial cables, which are commonly used in cellular communication as described above, the elongate inner conductor can be tubular in shape. The tubular inner conductor may also surround an inner dielectric material. The inner conductor is typically manufactured by forming a flat layer or sheet of conductive material into a tube with a longitudinal seam and welding the seam to form a continuous joint. The outer conductor is also similarly manufactured by forming a flat layer or metal sheet into a tube with a longitudinal seam that is welded to form a continuous joint.

The high frequency signals carried by the coaxial cable are concentrated in only a small portion, radially outermost, of the inner conductor, and a correspondingly small radially innermost portion of the outer conductor. This characteristic is attributed to the electromagnetic phenomenon called the skin effect. Therefore, only the thin outer radial portion of the tubular inner conductor carries the high frequency transmission. Conversely, the outer tubular conductor also carries the high frequency signals in the thin radially innermost portion.

Bimetallic layers have been used for the inner and/or outer tubular conductors in a coaxial cable where a higher conductivity and more expensive metal is used to provide the radially outermost portion of an inner conductor, and is used to provide the radially innermost portion of the outer conductor. For example, the outermost layer of the inner conductor may include a relatively costly and highly conductive metal such as copper, and the inner layer of the inner conductor may include a less costly and less conductive metal, such as aluminum. For example, U.S. Pat. No. 6,717,493 B2 to Chopra et al. and U.S. Patent Application No. 2004/0118591 A1 to Bufanda et al. each discloses a coaxial cable with such bimetallic tubular inner conductors.

Notwithstanding the benefits of a bimetal tubular inner conductor, there may be some shortcomings. For example, the manufacture of a bimetal tubular inner conductor usually involves some form of heat based welding, such as for example, conventional induction welding, to weld the seam to form a welded joint. Unfortunately, the two metals that form the bimetal tubular inner conductor usually have different melting temperatures. For example, copper and aluminum are commonly used as the outer and inner layers of the inner conductor, respectively. Copper has a melting point of 1100° C. and a conductivity of $59.6 \times 10^6$ S·m$^{-1}$, while aluminum has a lower melting point of 660° C. and a lower conductivity of $37.8 \times 10^6$ S·m$^{-1}$. This disparity in melting points makes welding of the joint relatively difficult.

In response to this particular shortcoming in manufacture of bimetal tubular inner conductors, coaxial cable manufacturers have developed a coaxial cable with a bimetal tubular inner conductor comprising an inlaid bimetallic layer, such as disclosed, for example, in U.S. Pat. No. 6,342,677 to Lee. This coaxial cable is more easily welded since only the inner metal layer is welded during manufacture of the bimetal tubular inner conductor. Nonetheless, the inlaid bimetal inner conductor is relatively costly to manufacture. Of course, similar considerations apply to the outer conductor of a coaxial cable. That is a conventional bimetallic layer may be difficult to weld, and an inlaid bimetallic layer may be relatively expensive.

SUMMARY OF THE INVENTION

In view of the foregoing background, it is therefore an object of the present invention to provide a coaxial cable including an outer conductor using a less expensive tubular bimetallic layer and associated methods.

This and other objects, features and advantages in accordance with the present invention are provided by a coaxial cable comprising an outer conductor including a tubular bimetallic layer and having a pair of opposing longitudinal edge portions at a longitudinal seam. The tubular bimetallic layer may comprise an inner metal layer and an outer metal layer bonded thereto and coextensive therewith. The opposing longitudinal edge portions may be angled outwardly to define a pair of adjacent outwardly extending tabs. The inner metal layer may have a higher electrical conductivity than the outer metal layer. Accordingly, a less expensive starting material may be used for the outer conductor, that is, a simple bimetallic strip, as compared to the more expensive inlaid bimetallic strip, for example.

The longitudinal seam may comprise a joint between the opposing longitudinal edge portions of the inner metal layer. Moreover, the joint may comprise at least one of a welded joint, an adhesive joint, and a soldered joint, for example.

The outer metal layer may comprise aluminum, and the inner metal layer may comprise copper. The tubular bimetallic layer may have a thickness in a range of about 0.005 to 0.050 inches. In addition, the inner metal layer may have a percentage thickness relative to an overall thickness of the tubular bimetallic layer in a range of about 1 to 30%.

The coaxial cable may further comprise another dielectric material layer filling the inner conductor. In addition, the coaxial cable may further include an insulating jacket surrounding the outer conductor.

A method aspect is for making a coaxial cable comprising an inner conductor, an outer conductor and a dielectric material layer therebetween. The method may include forming the inner conductor, forming the dielectric material layer surrounding the inner conductor, and forming the outer conductor by at least forming a bimetallic strip into a tubular bimetallic layer having a pair of opposing longitudinal edge portions angled outwardly to define a pair of adjacent outwardly extending tabs at a longitudinal seam. The tubular bimetallic layer may comprise an inner metal layer and an outer metal layer bonded thereto and coextensive therewith.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
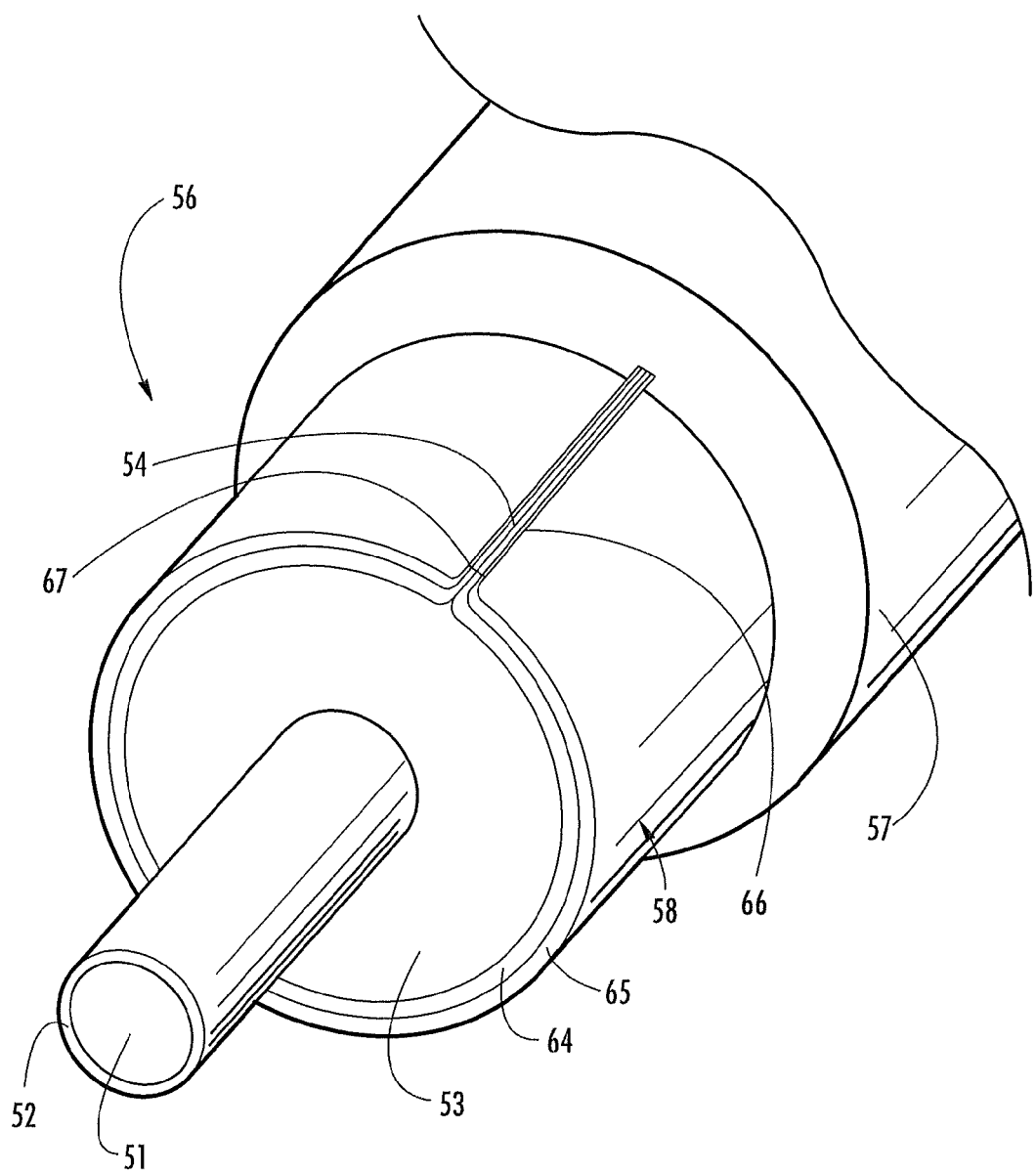
FIG. 1 is a perspective end view of a coaxial cable in accordance with the present invention.
Figure 2:
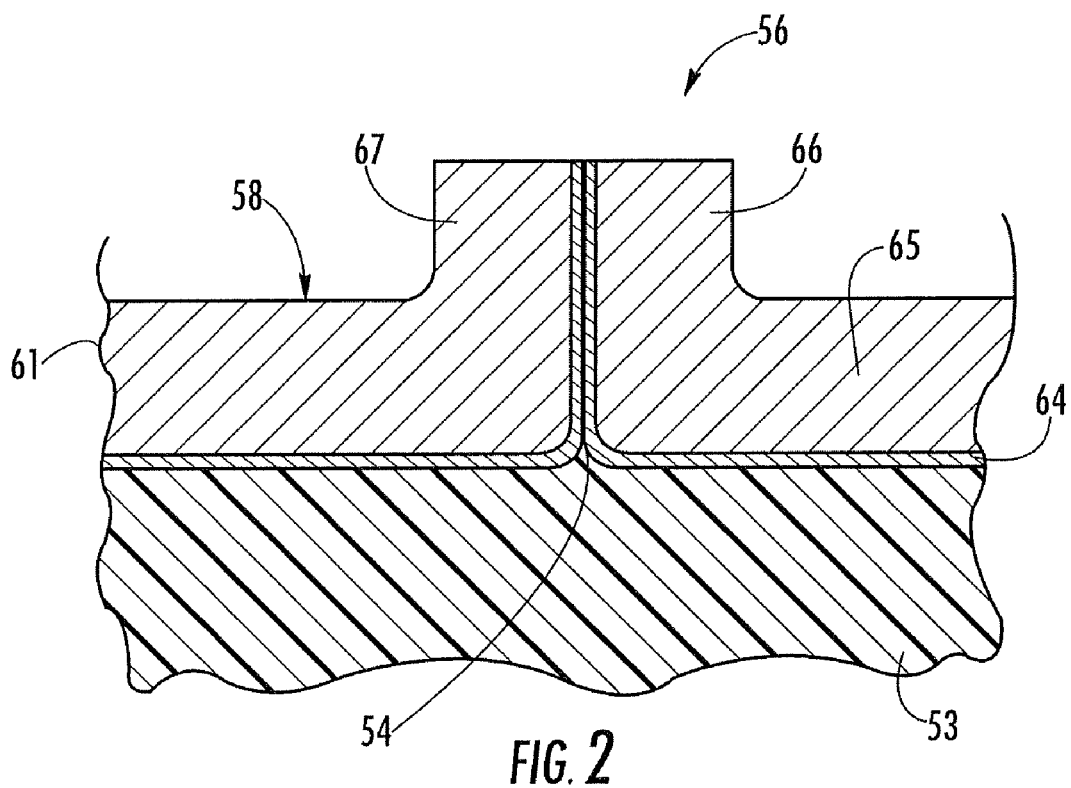
FIG. 2 is an enlarged cross-sectional view of a portion of the tubular bimetallic outer conductor of the coaxial cable of FIG. 1.

Referring now to FIGS. 1-2, a coaxial cable 56 with an outer conductor 58 comprising a tubular bimetallic layer 61 is now described. The coaxial cable 56 illustratively includes an inner conductor 52 and a dielectric material layer 53 between the inner conductor and the outer conductor 58.

The outer conductor 58 illustratively includes a tubular bimetallic layer 61 that has a pair of opposing longitudinal edge portions at a longitudinal seam 54. The tubular bimetallic layer 61 includes an inner metal layer 64 and an outer metal layer 65 bonded thereto and coextensive therewith.

The opposing longitudinal edge portions may be angled outwardly to define a pair of adjacent outwardly extending tabs 66, 67. The adjacent outwardly extending tabs 66, 67 are illustratively angled radially outwardly, although in other embodiments, the angle may be different from radial as will be appreciated by one skilled in the art. Moreover, in some embodiments, these tabs 66, 67 may define a "tail" that extends for a greater depth, not necessarily in a radial or linear direction, into an insulating jacket 57, while in other embodiments the tail may be severed more closely to the adjacent outer conductor portions.

The inner metal layer 64 may have a higher electrical conductivity than the outer metal layer 65 to facilitate signal carrying ability at the skin depth, for example. The outer metal layer 65 may comprise aluminum or any other suitable metal as will be appreciated by one skilled in the art. The inner metal layer 64 may comprise copper or any other suitable metal as will be appreciated by one skilled in the art.

The exemplary dimensions of the tubular bimetallic layer 61 are as follows. The tubular bimetallic layer 61 may have a thickness in a range of about 0.005 to 0.050 inches. In addition, the inner metal layer 64 may have a percentage thickness relative to an overall thickness of the tubular bimetallic layer 61 in a range of about 1 to 30%.

The coaxial cable 56 illustratively includes another dielectric material layer 51 filling the inner conductor 52. The coaxial cable 56 also illustratively includes an insulating jacket 57 surrounding the outer conductor 58.

Figure 3:
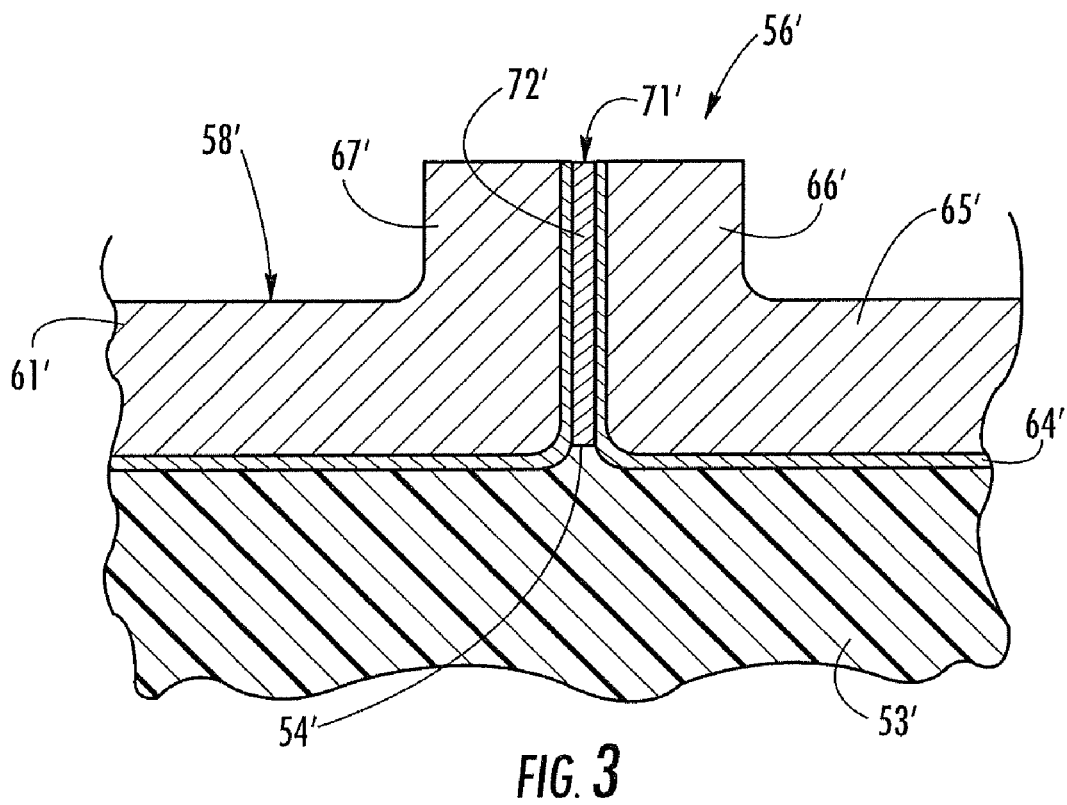
FIG. 3 is an enlarged cross-sectional view of a portion of the tubular bimetallic outer conductor of another embodiment of the coaxial cable in accordance with the present invention.

Referring now additionally to FIG. 3, another embodiment is now described. In this embodiment of the coaxial cable 56', those elements already discussed above with respect to FIGS. 1-2 are given prime notation and most require no further discussion herein. This embodiment differs from the previous embodiment in that the longitudinal seam 54' illustratively comprise a joint 71' between the opposing longitudinal edge portions of the inner metal layer 64'. In other words, the opposing end portions defining the seam 54 as shown in FIGS. 1-2 need not necessarily be joined together. However, in the embodiment of the coaxial cable 56 described with reference to FIG. 3, the seam 54' illustratively comprises a joint 71' wherein the edges are joined together.

This joint 71' is illustratively provided by an intervening layer 72' between the adjacent portions of the inner metal layer 64'. The joint 71' may comprise at least one of a welded joint, an adhesive joint, and a soldered joint, for example, as will be appreciated by those skilled in the art. Those of skill in the art will appreciate techniques and associated materials to form any of these joint types without further discussion herein.

Figure 5:
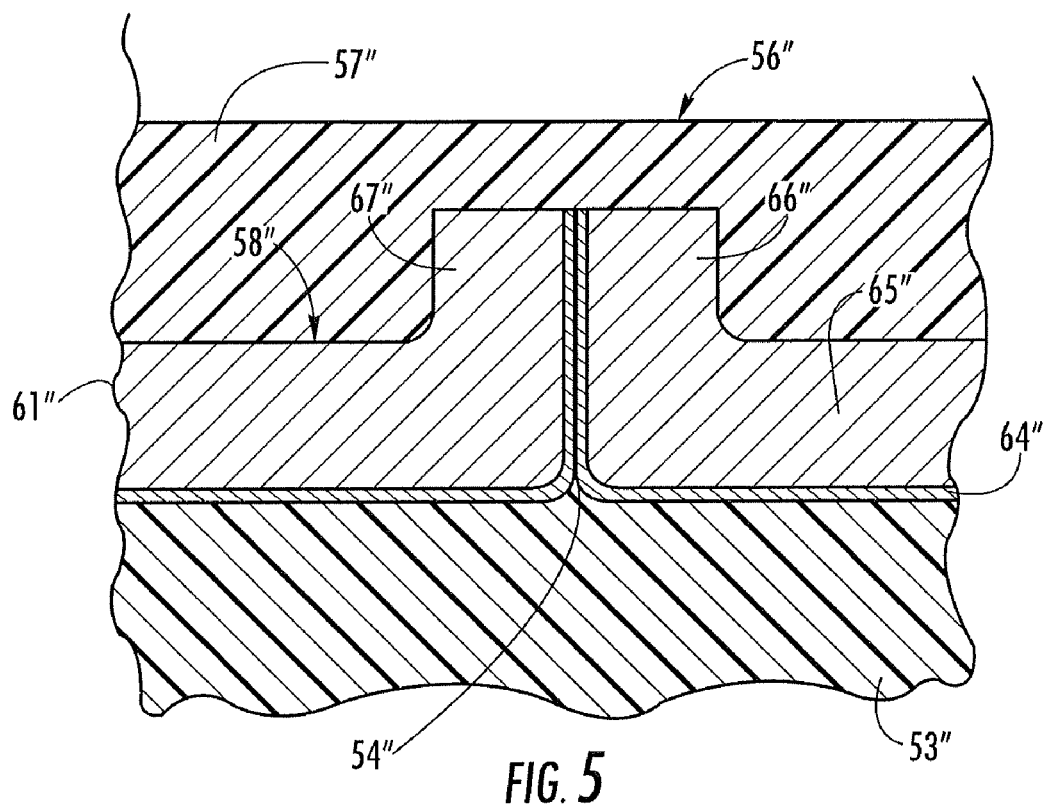
FIG. 5 is an enlarged cross-sectional view of a portion of the tubular bimetallic outer conductor of yet another embodiment of the coaxial cable in accordance with the present invention.

Referring now additionally to FIG. 5, another embodiment is now described. In this embodiment of the coaxial cable 56", those elements already discussed above with respect to FIGS. 1-2 are given double prime notation and most require no further discussion herein. This embodiment differs from the previous embodiment in that the tabs 66", 67" extend into the insulating jacket 57".

Figure 4:
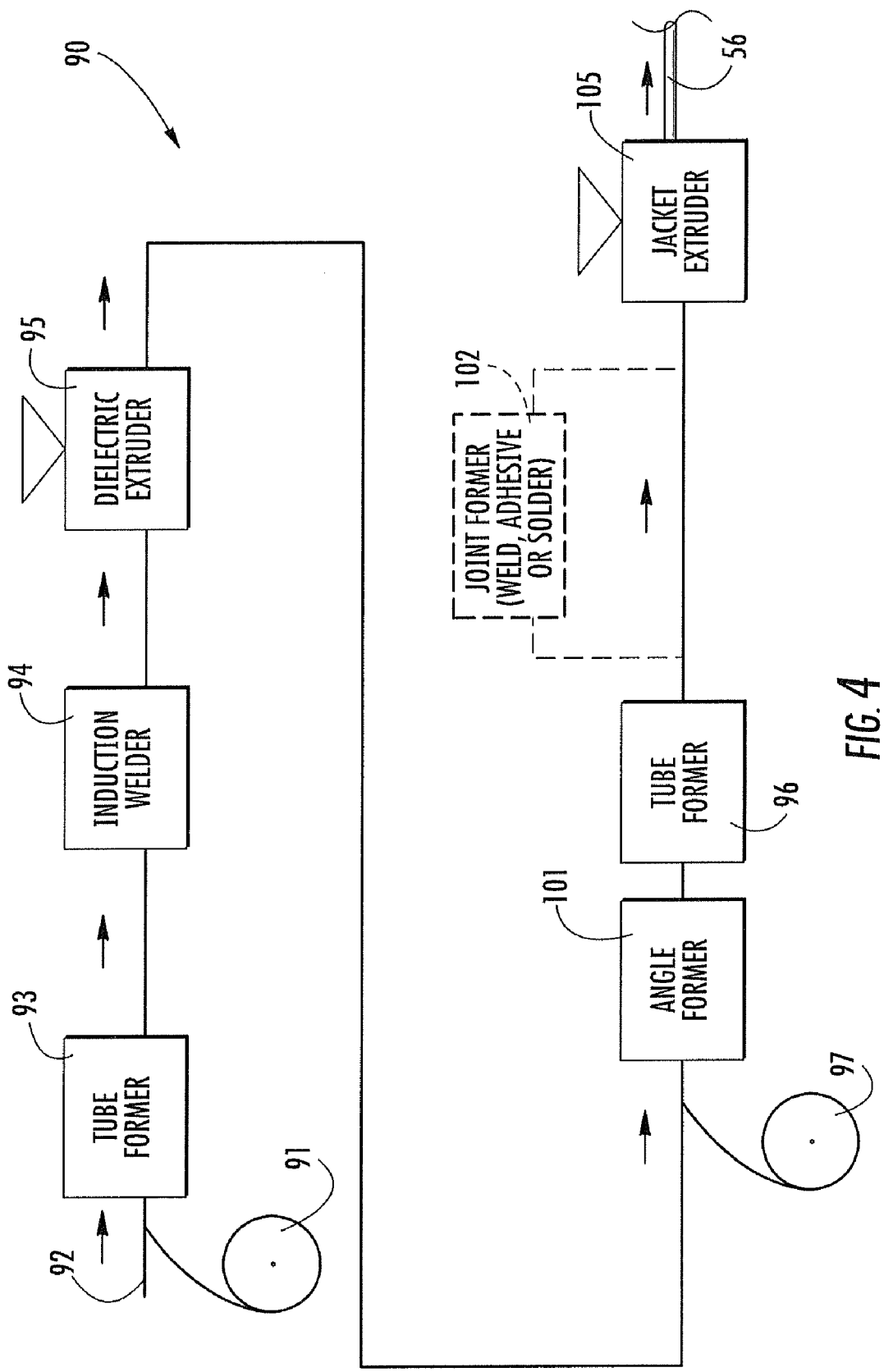
FIG. 4 is a schematic diagram of an apparatus for making the coaxial cable in accordance with the present invention.

Referring now additionally to FIG. 4, another aspect is directed to a method and apparatus 90 for making the coaxial cable 56 including an outer conductor 58 comprising the tubular bimetallic layer 61. The dielectric material rod 92 and the metallic strip from the supply reel 91 are fed into the tuber former 93. The tuber former 93 forms the inner conductor surrounding the dielectric material rod 92.

The output of the tube former 93 is fed into an induction welder 94, which welds the opposing longitudinal edges of the inner conductor. As will be appreciated by one skilled in the art, the dielectric material may be disposed inside the inner conductor downstream from the tube former 93. The output from the induction welder 94 is fed into the dielectric extruder 95, which forms a dielectric material layer surrounding the inner conductor.

The output from the dielectric extruder 95 is fed along with a bimetallic strip from the supply reel 97 into an angle former 101. The angle former 101 bends the opposing longitudinal edge portions of the bimetallic strip.

The output of the angle former 101 is fed into the second tube former 96. The second tube former 96 forms the bimetallic strip into an outer conductor comprising a tubular bimetallic layer having opposing longitudinal edge portions angled outwardly to define a pair of adjacent outwardly extending tabs at a longitudinal seam.

The longitudinal seam may comprise a joint between portions of the inner metal layer. As shown with the dashed lines, the output of the second tube former 96 may be fed into the joint former 102 to form either a welded joint, an adhesive joint, or a soldered joint, for example. The outer conductor may be fed from the output of the second tube former 96 into the jacket extruder 105.

The jacket extruder 105 illustratively forms the insulating jacket surrounding the outer conductor. The fabricated coaxial cable 56 with outer conductor comprising a tubular bimetallic layer is output from the jacket extruder 105, for take-up on a suitable take-up reel, not shown.

This application is related to copending patent applications entitled, COAXIAL CABLE INCLUDING TUBULAR BIMETALLIC INNER LAYER WITH BEVELLED EDGE JOINT AND ASSOCIATED METHODS, U.S. patent application Ser. No. 11/957,020; COAXIAL CABLE INCLUDING TUBULAR BIMETALLIC INNER LAYER WITH ANGLED EDGES AND ASSOCIATED METHODS, U.S. patent application Ser. No. 11/957,042; COAXIAL CABLE INCLUDING TUBULAR BIMETALLIC INNER LAYER WITH FOLDED EDGE PORTIONS AND ASSOCIATED METHODS, U.S. patent application Ser. No. 11/957,063; COAXIAL CABLE INCLUDING TUBULAR BIMETALLIC OUTER LAYER WITH BEVELLED EDGE JOINT AND ASSOCIATED METHODS, U.S. patent application Ser. No. 11/957,070; and COAXIAL CABLE INCLUDING TUBULAR BIMETALLIC OUTER LAYER WITH FOLDED EDGE PORTIONS AND ASSOCIATED METHODS, U.S. patent application Ser. No. 11/957,100 which are tiled on the same date and by the same assignee and inventors, the disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A coaxial cable comprising:
    an inner conductor, an outer conductor, a dielectric material layer therebetween, and an insulating jacket surrounding said outer conductor;
    said outer conductor comprising a tubular bimetallic layer and having a pair of opposing longitudinal edge portions at a longitudinal seam;
    said tubular bimetallic layer comprising an inner metal layer and an outer metal layer bonded thereto and coextensive therewith;
    said opposing longitudinal edge portions being angled outwardly to define a pair of adjacent outwardly extending tabs, the tabs extending radially into said insulating jacket.

2. A coaxial cable according to claim 1 wherein said inner metal layer has a higher electrical conductivity than said outer metal layer.

3. A coaxial cable according to claim 1 wherein the longitudinal seam comprises a joint between the opposing longitudinal edge portions of said inner metal layer.

4. A coaxial cable according to claim 3 wherein said joint comprises at least one of a welded joint, an adhesive joint, and a soldered joint.

5. A coaxial cable according to claim 1 wherein said outer metal layer comprises aluminum.

6. A coaxial cable according to claim 1 wherein said inner metal layer comprises copper.

7. A coaxial cable according to claim 1 wherein said tubular bimetallic layer has a thickness in a range of about 0.005 to 0.050 inches.

8. A coaxial cable according to claim 1 wherein said inner metal layer has a percentage thickness relative to an overall thickness of said tubular bimetallic layer in a range of about 1 to 30%.

9. A coaxial cable according to claim 1 further comprising another dielectric material layer filling said inner conductor.

10. A coaxial cable comprising:
    an inner conductor, an outer conductor, a dielectric material layer therebetween, and an insulating jacket surrounding said outer conductor;
    said outer conductor comprising a tubular bimetallic layer having a pair of opposing longitudinal edge portions at a longitudinal seam;
    said tubular bimetallic layer comprising an inner metal layer and an outer metal layer bonded thereto and coextensive therewith, said inner metal layer having a higher electrical conductivity than said outer metal layer;
    said opposing longitudinal edge portions being angled radially outwardly to define a pair of adjacent radially outwardly extending tabs, the tabs extending radially into said insulating jacket;
    the longitudinal seam comprising a joint between the opposing longitudinal edge portions of said inner metal layer.

11. A coaxial cable according to claim 10 wherein said joint comprises at least one of a welded joint, an adhesive joint, and a soldered joint.

12. A coaxial cable according to claim 10 wherein said outer metal layer comprises aluminum; and wherein said inner metal layer comprises copper.

13. A coaxial cable according to claim 10 wherein said tubular bimetallic layer has a thickness in a range of about 0.005 to 0.050 inches.

14. A coaxial cable according to claim 10 wherein said inner metal layer has a percentage thickness relative to an overall thickness of said tubular bimetallic layer in a range of about 1 to 30%.

15. A coaxial cable according to claim 10 further comprising another dielectric material layer filling said inner conductor.

16. A method for making a coaxial cable comprising an inner conductor, an outer conductor and a dielectric material layer therebetween, the method comprising:
    forming the inner conductor;
    forming the dielectric material layer surrounding the inner conductor;
    forming the outer conductor by at least forming a bimetallic strip into a tubular bimetallic layer having a pair of opposing longitudinal edge portions angled outwardly to define a pair of adjacent outwardly extending tabs at a longitudinal seam, the tubular bimetallic layer comprising an inner metal layer and an outer metal layer bonded thereto and coextensive therewith; and
    forming an insulating jacket surrounding the outer conductor, the tabs extending radially into the insulating jacket.

17. A method according to claim 16 wherein the inner metal layer has a higher electrical conductivity than the outer metal layer.

18. A method according to claim 16 wherein the outer metal layer comprises aluminum.

19. A method according to claim 16 wherein the inner metal layer comprises copper.

20. A method according to claim 16 wherein the longitudinal seam comprises a joint between the opposing longitudinal edge portions of the inner metal layer.

21. A method according to claim 20 wherein the joint comprises at least one of a welded joint, an adhesive joint, and a soldered joint.

22. A method according to claim 16 wherein the tubular bimetallic layer has a thickness in a range of about 0.005 to 0.050 inches.

23. A method according to claim 16 wherein the inner metal layer has a percentage thickness relative to an overall thickness of the tubular bimetallic layer in a range of about 1 to 30%.

* * * * *